United States Patent [19]
Gotoh et al.

[11] Patent Number: 5,062,348
[45] Date of Patent: Nov. 5, 1991

[54] SEAL UNIT FOR BRAKE BOOSTER

[75] Inventors: Hiroya Gotoh; Kazuo Kobayashi, both of Saitama, Japan

[73] Assignee: Jidosha Kiki Co., Ltd., Tokyo, Japan

[21] Appl. No.: 567,912

[22] Filed: Aug. 15, 1990

[30] Foreign Application Priority Data

Aug. 31, 1989 [JP] Japan .............................. 1-102617[U]

[51] Int. Cl.$^5$ .......................... F15B 9/10; F01B 19/00
[52] U.S. Cl. ................. 91/369.2; 91/376 R; 92/48; 92/98 D
[58] Field of Search ............... 91/369.1, 369.2, 376 R; 92/48, 98 R, 98 D, 99, 169.1

[56] References Cited

U.S. PATENT DOCUMENTS

| | | |
|---|---|---|
| 2,549,818 | 4/1951 | Joy . |
| 2,773,511 | 12/1956 | Mercier .................. 92/98 R |
| 2,919,718 | 1/1960 | Mercier .................. 92/98 R |
| 2,932,321 | 4/1960 | Mercier .................. 92/98 R |
| 3,411,414 | 11/1968 | Brown et al. ............. 92/48 |
| 3,478,519 | 11/1969 | Eggstein ................. 91/376 R |
| 3,897,718 | 8/1975 | Gardner et al. .......... 92/48 X |
| 3,958,497 | 5/1976 | Gardner et al. .......... 92/48 |
| 4,512,237 | 4/1985 | Endoh et al. ............ 91/376 R |
| 4,619,185 | 10/1986 | Mori et al. ............. 91/376 R |
| 4,738,186 | 4/1988 | Rossigno et al. ........ 92/98 D |
| 4,793,242 | 12/1988 | Kobayashi . |
| 4,898,081 | 2/1990 | Fecher .................. 91/369.1 X |

FOREIGN PATENT DOCUMENTS

| | | |
|---|---|---|
| 44-9770 | 5/1969 | Japan . |
| 53-23913 | 7/1978 | Japan . |
| 57-46206 | 12/1982 | Japan . |
| 60-154952 | 8/1985 | Japan . |

Primary Examiner—Edward K. Look
Assistant Examiner—John Ryznic
Attorney, Agent, or Firm—Flynn, Thiel, Boutell & Tanis

[57] ABSTRACT

A seal unit is provided for a brake booster such as of a tandem type which includes a center plate within its shell. The brake booster includes annular means disposed within the shell for maintaining a hermetic seal between the center plate and a valve body. An axial portion of the center plate is formed with an axially extending cylindrical portion, the end of which is folded radially inward to define a U-shaped fold. The annular seal means is fitted inside the cylindrical portion, with its part disposed between the inner peripheral surface of the cylindrical portion and the outer peripheral surface of the fold. This effectively prevents the annular seal means from being withdrawn from the center plate.

9 Claims, 1 Drawing Sheet

SEAL UNIT FOR BRAKE BOOSTER

FIELD OF THE INVENTION

The invention relates to a brake booster, and more particularly, to a seal unit for a brake booster such as of a tandem type which is provided with a center plate within its shell.

DESCRIPTION OF THE PRIOR ART

A brake booster of tandem type generally comprises a center plate disposed within a shell to divide its interior into a front and a rear chamber, a valve body slidably extending through the center plate, annular seal means for maintaining a hermetic seal between the center plate and the valve body, a front power piston and a rear power piston disposed within respective chambers divided by the center plate and connected to the valve body, and diaphragms applied to the back surfaces of the respective power pistons to divide each chamber into a constant and a variable pressure chamber (see Japanese Patent Publications No. 9,770/1969 and No. 23,913/1978 and Japanese Laid-Open Patent Application No. 154,952/1985).

The annular seal means which serve maintaining a hermetic seal between the center plate and the valve body normally comprises a seal member in the form of a rubber ring, and a bearing disposed on the seal member for guiding the valve body for sliding movement. The seal member is fitted into an axially extending cylindrical portion which is formed in an axial portion of the center plate. The seal member is mounted on the center plate by disposing one axial end thereof in abutment against an L-shaped extension which is folded radially inward from the end of the cylindrical portion and by using a retainer which is a press fit into the cylindrical portion to support the other end of the seal member.

However, in the prior art practice, the ring-shaped seal member has been firmly secured to the center plate by means of the retainer. As a consequence of this, if an eccentric loading is applied during the operation or if the sliding resistance increases extremely as a result of insufficient supply of lubricating grease, the seal member may be withdrawn from a clearance defined between the inner peripheral edge of the L-shaped extension and the external peripheral surface of the valve body as the valve body moves in one direction.

SUMMARY OF THE INVENTION

In view of the foregoing, the invention relates to a brake booster such as of a tandem type mentioned above in which annular means is provided within a shell to maintain a hermetic seal between the center plate and the valve body. In accordance with the invention, an axial portion of the center plate is formed with an axially extending cylindrical portion, the end of which is folded back radially inward to define a U-shaped fold, and the annular seal means is fitted inside the cylindrical portion with its part disposed between the inner peripheral surface of the cylindrical portion and the external peripheral surface of the fold.

With this arrangement, if the annular seal means tends to be withdrawn from the clearance between the fold and the valve body, part of the annular seal means which is disposed between the inner peripheral surface of the cylindrical portion and the outer peripheral surface of the U-shaped fold presents a strong resistance to such withdrawal, effectively preventing the disengagement of the annular seal means.

Above and other objects, features and advantages of the invention will become apparent from the following description of an embodiment thereof with reference to the attached drawings.

DETAILED DESCRIPTION OF EMBODIMENT

Figure 1:
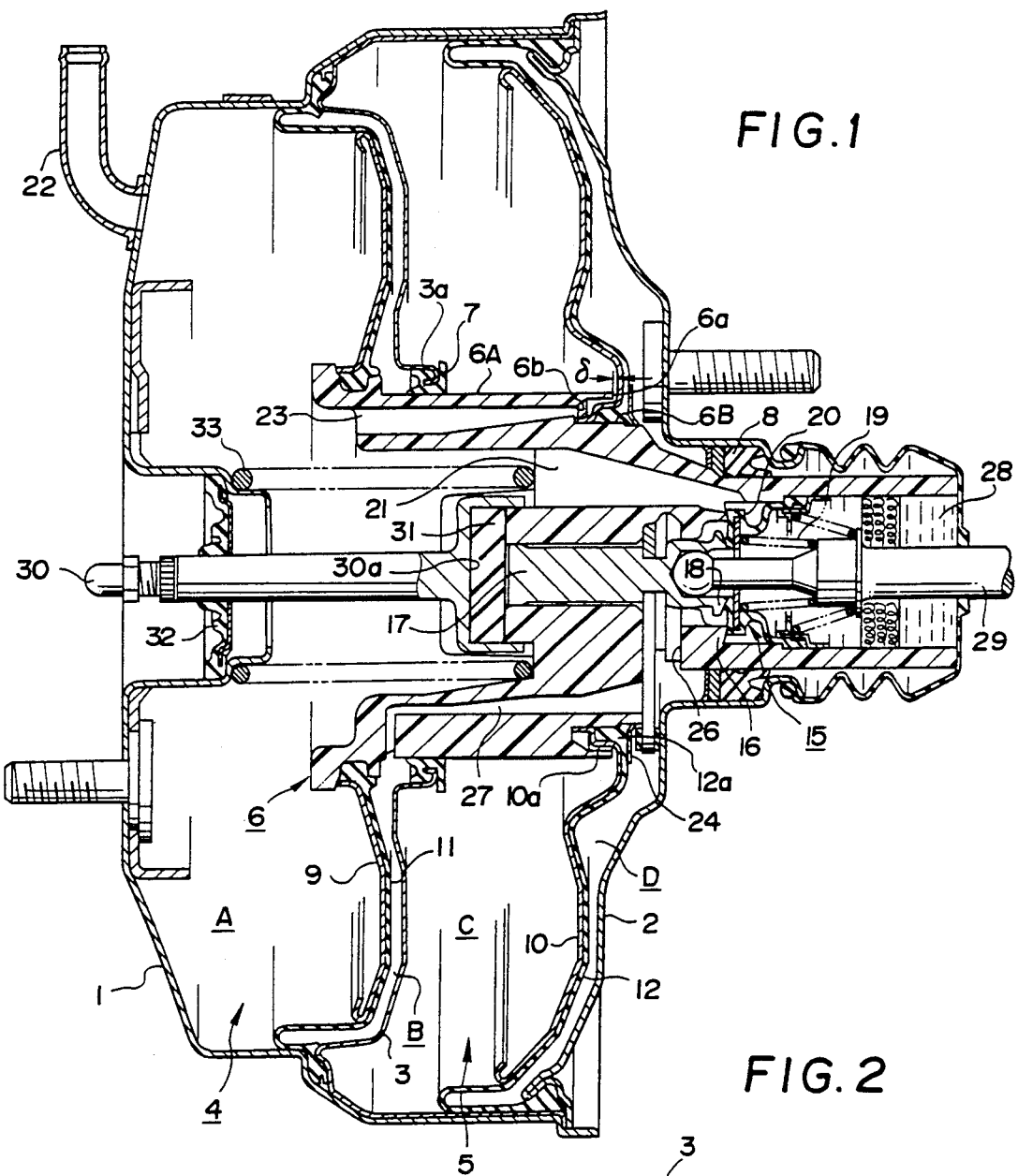
FIG. 1 is a longitudinal section, partly in side elevation, of one embodiment of the invention.

Referring to the drawings, an embodiment of the invention will now be described. In FIG. 1, a front shell 1 and a rear shell 2 define an enclosed vessel, the interior of which is divided by a centrally disposed center plate 3 into a front chamber 4 and a rear chamber 5, disposed on the opposite sides thereof. A substantially cylindrical valve body 6 slidably extends through axial portions of the rear shell 2 and the center plate 3, with annular seal means 7, 8 maintaining a hermetic seal therebetween.

Connected to the valve body 6 are a front power piston 9 and a rear power piston 10 which are disposed in the front and the rear chamber 4, 5, respectively, and a front diaphragm 11 and a rear diaphragm 12 are applied to the back surfaces of the respective power pistons 9, 10, respectively. Thus defining a constant pressure chamber A and a variable pressure chamber B across the front diaphragm 11, and also defining a constant pressure chamber C and a variable pressure chamber D across the rear diaphragm 12.

A valve mechanism 15 is disposed within the valve body 6 for switching a fluid circuit between the pair of constant pressure chambers A, C and the pair of variable pressure chambers B, D. Specifically, the valve mechanism 15 comprises an annular, first valve seat 16 formed on the valve body 6, an annular, second valve seat 18 formed on the right-end of a valve plunger 17 which is slidably disposed within the valve body 6 at a location radially inward of the first valve seat 16, and a valve element 20 urged by a spring 19 to be seated upon either valve seat 16 or 18 from the right, as viewed in FIG. 1.

A space located radially outward of an annular seat defined by the contact between the valve element 20 and the first valve seat 16 communicates with the constant pressure chamber A through an axially extending constant pressure passage 21 formed in the valve body 6, and the chamber A communicates with an intake manifold, not shown, through a tubing 22 mounted on the front shell 1 which is used to introduce a negative pressure.

The constant pressure chamber A communicates with the constant pressure chamber C through a second, axially extending constant pressure passage 23 also formed in the valve body 6. The right end of the passage 23 communicates with an annular groove 6b which is formed at a stepped end face 6a between a larger diameter portion 6A and an intermediate diameter portion 6B of the valve body 6. An axial portion of the rear power piston 10 is formed with a stepped cylindrical portion 10a which projects forwardly. A free end portion having a reduced diameter of the stepped cylindrical portion 10a is fitted around the peripheral surface of the annular groove 6b and in abutment against the bottom of the annular groove 6b.

Accordingly, the constant pressure passage 23 communicates with the annular groove 6b toward the outer periphery of the stepped cylindrical portion 10a, and is maintained in communication with the constant pressure chamber C through a clearance -67 formed between the stepped end face 6a of the valve body 6 and the rear power piston 10, or an opening formed adjacent to the rear power piston 10.

Additionally, a bead 12a extending around the inner periphery of the rear diaphragm 12 is fitted inside the stepped cylindrical portion 10a, thus preventing a communication of the constant pressure passage 23 with the variable pressure chamber D. The withdrawal of the bead 12a from inside the stepped cylindrical portion 10a is prevented by a retainer 24 which is fitted around the outer periphery of the valve body 6.

On the other hand, a space located radially inward of an annular seat defined by the contact between the valve element 20 and the first valve seat 16 and radially outward of another annular seat defined by the contact between the valve element 20 and the second valve seat 18, or located intermediate the both annular seats, communicates with the variable pressure chamber D through a radially extending variable pressure passage 26 formed in the valve body 6, and thence with the variable pressure chamber B through another variable pressure passage 27 formed in the valve body 6. It is to be noted that the opening of the variable pressure passage 27 into the variable pressure chamber B is located close to the front diaphragm 11 applied to the back surface of the front power piston 9.

A space located radially inward of the annular seat defined by the contact between the valve element 20 and the second valve seat 18 communicates with the atmosphere through a filter 28.

The right end of the valve plunger 17 which is slidably disposed within the valve body 6 is connected to an input shaft 29 which is mechanically coupled to a brake pedal, not shown. The left end of the valve plunger 17 is disposed in opposing relationship with the right end face of a reaction disc 31 which is received in a recess 30a formed in one end of a push rod 30. The left end of the push rod 30 slidably extends through an axial portion of the front shell 1 to the exterior thereof, with a seal member 32 interposed therebetween, for connection with a piston of a master cylinder, not shown. The valve body 6 is normally maintained in its inoperative position shown by a return spring 33.

Figure 2:
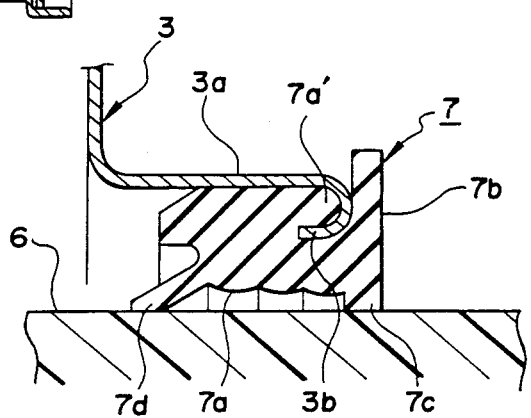
FIG. 2 is an enlarged section of part shown in FIG. 1.

As shown in FIG. 2, the inner peripheral portion of the center plate 3 on which the annular seal means 7 is disposed is formed with a cylindrical portion 3a of a given length extending rearwardly. The rear end of the cylindrical portion 3a is folded back radially inward to form a U-configuration, and the annular seal means 7 is mounted on the fold 3b thus formed.

In the present embodiment, the annular seal means 7 comprises a single annular seal member including a body 7a which is a press fit into the cylindrical portion 3a of the center plate 3, an ear 7b continuing from the body 7a and disposed in abutment against the rear side of the fold 3b, a first seal 7c extending radially inward from the ear 7b and disposed in sliding contact with the outer periphery of the valve body 6, and a second seal 7d extending radially inward and forwardly in an oblique manner from the front end of the body 7a and disposed in sliding contact with the outer periphery of the valve body 6. Part 7a' of the body 7a is disposed between the inner peripheral surface of the cylindrical portion 3a and the outer peripheral surface of the fold 3b.

With the described arrangement, if the annular seal means 7 tends to be driven to the right when it is held in firm engagement with the outer peripheral surface of the valve body 6 as the valve body 6 moves to the right, the body 7a of the annular seal means 7 will tend to be withdrawn to the right, from the clearance between the inner peripheral surface of the fold 3b and the outer peripheral surface of the valve body 6, but part 7a' of the body 7a of the annular seal means 7 which is disposed between the inner peripheral surface of the cylindrical portion 3a and the outer peripheral surface of the fold 3b presents a strong resistance to such withdrawal, thus effectively preventing the withdrawal of the annular seal means 7 from the center plate 3.

In the described embodiment, the invention has been applied to a brake booster of tandem type which includes a single center plate within its seal, but it should be understood that the invention is equally applicable to a brake booster of triple type which includes a pair of center plates disposed within its shell.

While the invention has been shown and described above in connection with a preferred embodiment thereof, it should be understood that a number of changes, modifications and substitutions therein will readily occur to one skilled in the art from the above disclosure without departing from the spirit and scope of the invention defined by the appended claims.

What is claimed is:

1. In a brake booster including a center plate disposed within a shell to divide its interior into a front chamber and a rear chamber, a valve body slidably extending through the center plate, annular seal means for maintaining a hermetic seal between the center plate and the valve body, a pair of power pistons disposed within respective chambers and connected to the valve body, and a pair of diaphragms applied to the back surfaces of the respective power pistons to divide each chamber into a constant pressure chamber and a variable pressure chamber; the improvement wherein said center plate includes a central, axially extending cylindrical portion, an end of the cylindrical portion being folded back radially inwardly to form a generally axially opening U-shaped fold, said U-shaped fold including a pair of radially spaced and generally axially extending leg portions which are connected by a generally radially extending bight portion, said axially extending cylindrical portion defining one of said leg portions, the annular seal means being fitted inside the cylindrical portion and confined radially between said cylindrical portion and said valve body, and a part of said annular seal means being disposed radially between said leg portions of the fold.

2. A brake booster according to claim 1 in which the annular seal means comprises a single annular seal member formed of rubber, and included a body which is a press fit inside the cylindrical portion of the center plate, an ear continuously extending from the body and disposed in abutment against the rear side of the fold of the center plate, a first seal extending radially inward from the ear and disposed in sliding contact with the outer periphery of the valve body, and a second seal extending radially inward and forwardly in an oblique manner from the front end of the body and disposed in sliding contact with the outer periphery of the valve body.

3. A brake booster according to claim 1 in which the cylindrical portion of the center plate is formed as a rearward extension.

4. A brake booster according to claim 1 in which the brake booster comprises a brake booster of tandem type.

5. A brake booster according to claim 2 in which the cylindrical portion of the center plate is formed as a rearward extension.

6. A brake booster according to claim 2 in which the brake booster comprises a brake booster of tandem type.

7. A brake booster according to claim 3 in which the brake booster comprises a brake booster of tandem type.

8. A brake booster according to claim 1, wherein said annular seal means includes a body portion which is press fit radially between said valve body and said cylindrical portion of said center plate, said body portion being confined, in its entirety, radially between said valve body and said cylindrical portion, the other said leg portion of said U-shaped fold having a free end which is embedded in said body portion as confined between said valve body and said cylindrical portion of said center plate, said body portion including said part of said annular seal means, and said body portion having another part which is interposed radially between said valve body and said other leg portion.

9. A brake booster according to claim 8, wherein said annular seal means includes an ear which is connected to said body portion adjacent said U-shaped fold, said ear abutting said bight portion on an axial side of said bight portion opposite said free end of said other leg portion, said ear projecting radially outwardly beyond said cylindrical portion of said center plate, and said ear including a radially inner seal face disposed in slidable sealing engagement with said valve body.

* * * * *